INVENTORS.
JOHN E. SCROGGS, JOHN E. WEBB
and GLENN F. SCHLUND
BY
*Fishburn and Gold*
ATTORNEYS

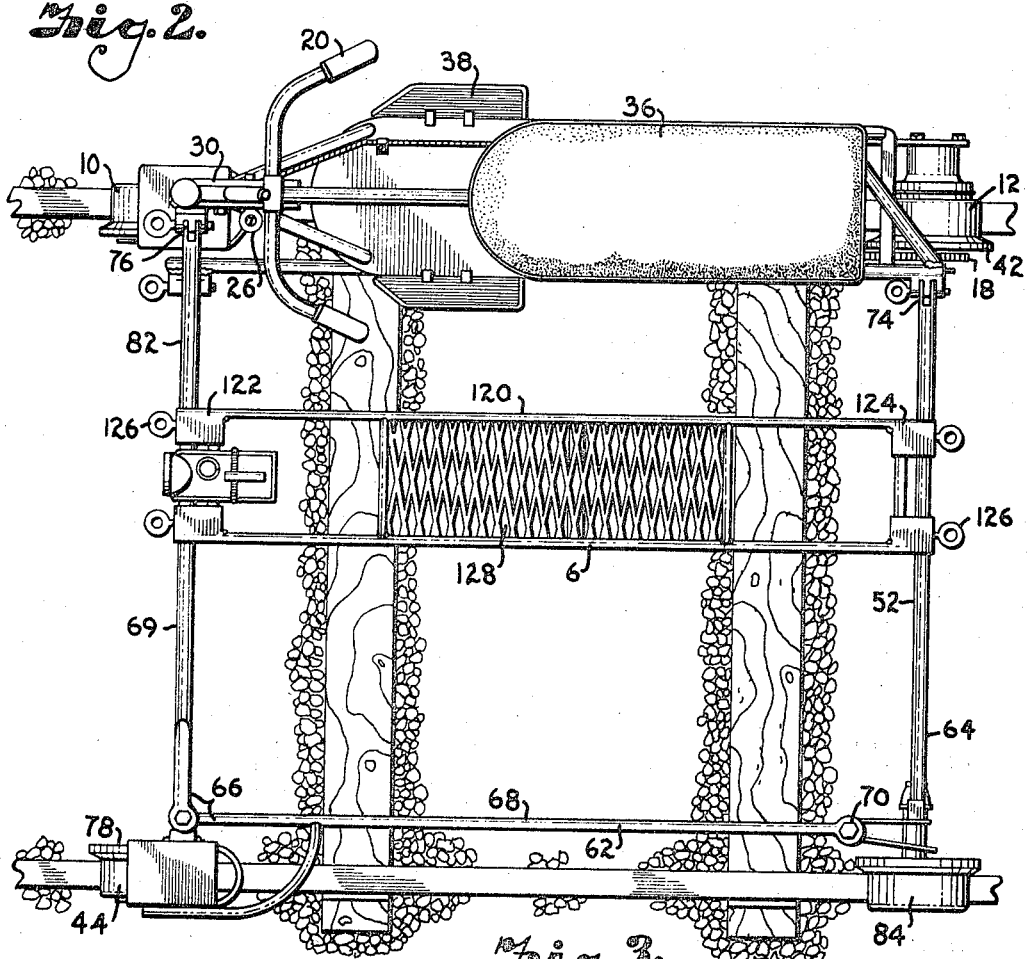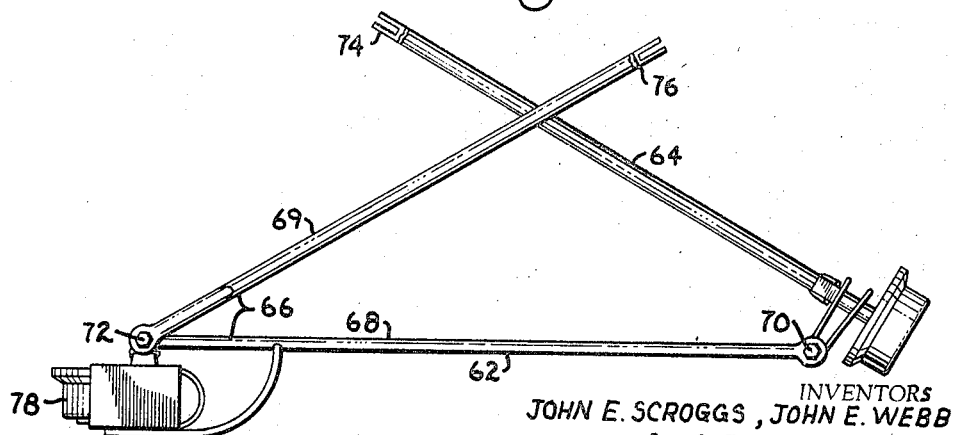

Jan. 28, 1969  J. E. SCROGGS ET AL  3,424,106
TRACKMAN'S CAR
Filed Nov. 14, 1966  Sheet 3 of 4
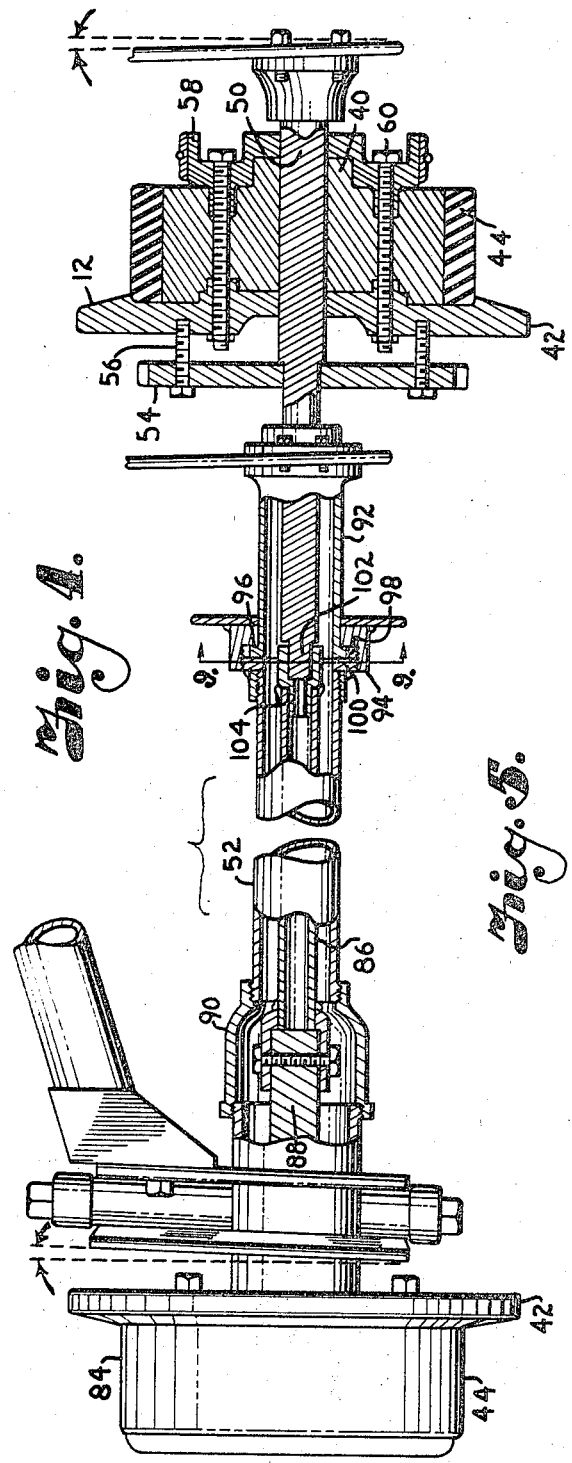
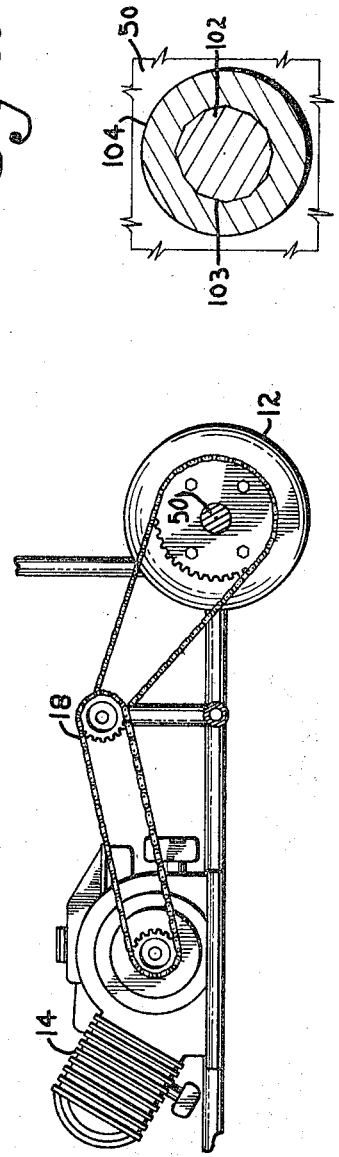
INVENTORS.
JOHN E. SCROGGS, JOHN E. WEBB
and GLENN F. SCHLUND
BY
ATTORNEYS

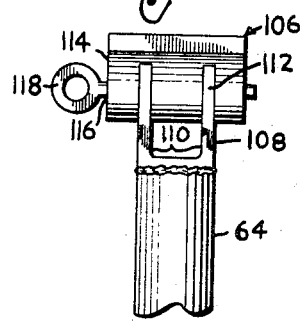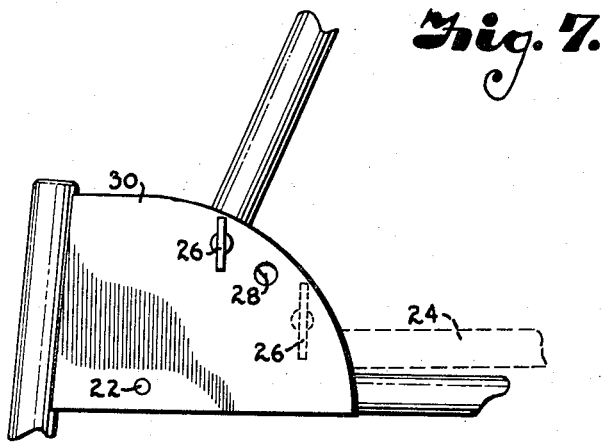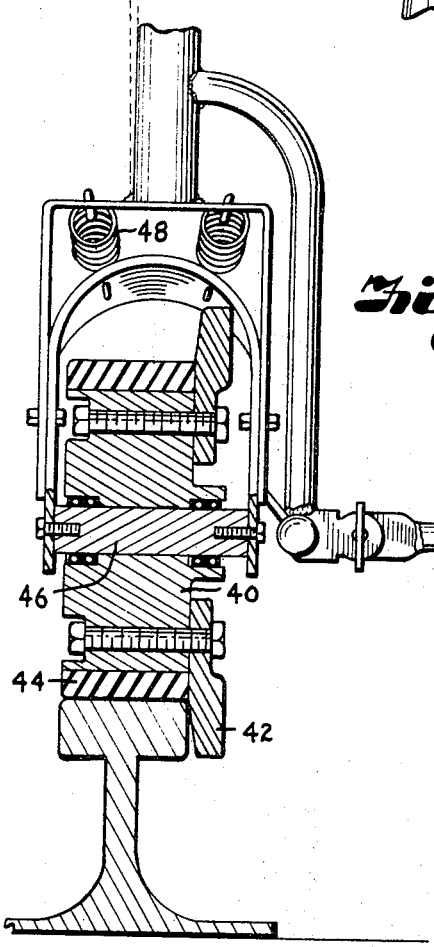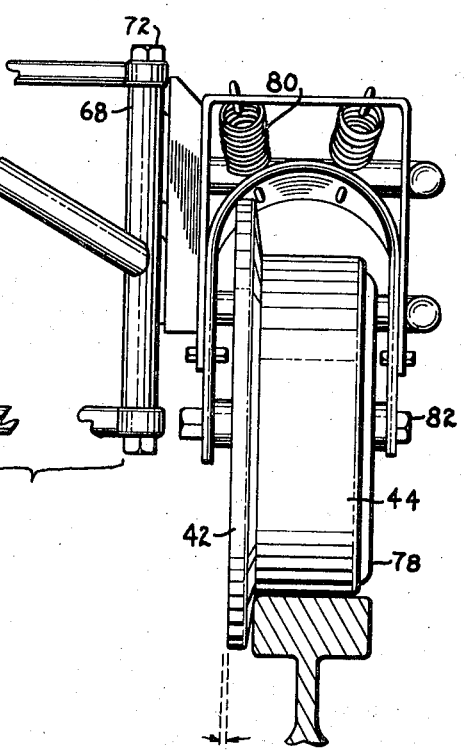
INVENTORS.
JOHN E. SCROGGS, JOHN E. WEBB
and GLENN F. SCHLUND
BY
ATTORNEYS

United States Patent Office 3,424,106
Patented Jan. 28, 1969

3,424,106
TRACKMAN'S CAR
John E. Scroggs, 1214 W. 62nd St., Kansas City, Mo. 64113; John E. Webb, 1500 N. 44th St., Kansas City, Kans. 66102; and Glenn F. Schlund, Shawnee Mission, Kans. (9824 Outlook Drive, Overland Park, Kans. 66207)
Filed Nov. 14, 1966, Ser. No. 594,161
U.S. Cl. 105—26.1     9 Claims
Int. Cl. B61d 5/12; B61c 13/00; B61f 13/00

ABSTRACT OF THE DISCLOSURE

A portable vehicle for use on rails and having laterally spaced side frame members with one supporting a power unit. The side frame members are connected by spaced transverse truss like members having spaced separable connections to said one frame member and pivotal connections to the other. The erected frame structure of the vehicle is stiffened by longitudinal stiffner members arranged between and spaced from the side frame members and having ends detachably connected to the transverse connector members. Each of the side frame members have fore and aft wheels. A drive shaft is operatively connected to opposed wheels on the side frames with the drive shaft being driven by the power unit to rotate said wheels to propel the vehicle. The drive shaft is detachably connected relative to said wheels whereby upon detachment of the drive shaft and the transverse frame connectors and longitudinal stiffner, the structure may be collapsed into three assemblies that are easily transportable.

---

This invention relates to motorized vehicles, and more particularly to such a vehicle for use on rail systems and the like, for transportation of personnel, equipment and materials for rail inspection, maintenance and repair.

In such operations as rail inspection, maintenance and repair, it is desrable to provide such a vehicle for movement along particular track sections with the capability of conveying said vehicle, by other means, such as rail cars, trucks or the like, to other track sections on the same or other rail lines. As vehicles of this nature are normally quite large, cumbersome and heavy, it is particularly desirable that such a unit be easily dismantled and assembled such that the unit may be broken down at one point, conveniently loaded aboard a transporting vehicle, and reassembled at a new destination with ease.

The principal objects of this invention are: to alleviate the aforementioned difficulties in the art by providing a new and improved vehicle for utilization on rail systems which may be easily assembled and disassembled to facilitate transportation of said vehicle between various localities; to provide such a vehicle which may be quickly disassembled into compact components and carried in an automobile or light truck, with each of said components being shaped or foldable to a relatively flat, compact package; to provide such a vehicle having a pair of opposed spaced rear wheels, each of said wheels being driven such that the carriage of the vehicle remains aligned on the opposed rails with no tendency for the unit or vehicle to skew whereby small irregularities in the track could effect a derailment of the vehicle; to provide such a vehicle being basically comprised of a power unit and an outrigger unit with each of said units being releasably retained in cooperative relation to form the overall rail vehicle, said units being foldable upon disengagement into compact, easily transportable packages; to provide such a vehicle having a drive shaft operatively connected to a live axle on each of the power units and the outrigger unit; to provide a driven wheel on each of such units for engagement in opposed relation to each of a pair of rail means with said drive shaft being operatively connected to a power means on said power unit and being releasably connected to one of said live axles whereby said drive shaft may be disengaged from one of said units and suitably folded adjacent the other of said units to form a compact, easily transportable package; to provide such a vehicle wherein the power unit and its front axle and the front axle of the outrigger unit are canted 1:20 toward gauge; to provide a vehicle which may track without a flanging action where the flanges of the rail wheel are caused to rub against the track; to provide such a vehicle which is relatively light, such that a single individual may lift the vehicle to reverse its direction on the track or to remove the vehicle from the track, this factor being extremely important as vehicles of this nature do not have the right of way on rail systems; to provide such a unit having a tool carrier which extends generally parallel to the rail means extending between a pair of opposed foldable connecting frames between the outrigger assembly and the power unit to serve as a tool equipment or material carrier and a brace to add rigidity and strength to the vehicular structure; to provide such a unit having a weight distribution wherein 90% of the unit weight is less than ten inches above the rails providing an extremely low center of gravity producing excellent tracking capabilities; to provide such a unit employing a relatively low horsepower engine effecting economy in operation and employing a new and novel construction effecting economy in manufacture and operation.

Other objects and advantages of this invention will become apparent from the following description taken in connection with the accompanying drawings wherein are set forth by way of illustration and example certain embodiments.

FIG. 2 is a plan view of the vehicle illustrated in FIG. 1 showing the power unit, the outrigger assembly and the tool or material carrier in their assembled relation.

FIG. 3 is a plan view of the outrigger assembly in a semi-folded position illustrating the foldable nature of the outrigger assembly into a compact package.

FIG. 4 is an elevational view of the driven rear wheels of the outrigger assembly and power unit which are operatively connected in a releasable manner by a drive shaft with portions of said wheels, drive shaft housing and axle broken away to illustrate the fixed and releasable connections of the drive shaft with the live axles and the structure of the rear driven wheels.

FIG. 5 is a fragmentary, vertical sectional view through the power unit of the vehicle illustrating the power means and its connection to the live axle of the power unit.

FIG. 6 is a fragmentary, plan view illustrating a typical connection between the frame members of the outrigger structure and the power unit.

FIG. 7 is a fragmentary, elevational view of a foldable handle bar assembly on the power unit showing the handle bar supporting column in a folded position in dashed lines.

FIG. 8 is a fragmentary elevational view of the forward wheels of the power unit and the outrigger assembly with the forward wheel of the power unit in section to illustrate its interior construction, with a portion of the framework of the outrigger assembly broken away.

FIG. 9 is a fragmentary, vertical section view taken on line 9—9 of FIG. 4 to show the releasable connection between the drive shaft and the live axle of the power unit.

Figure 1:
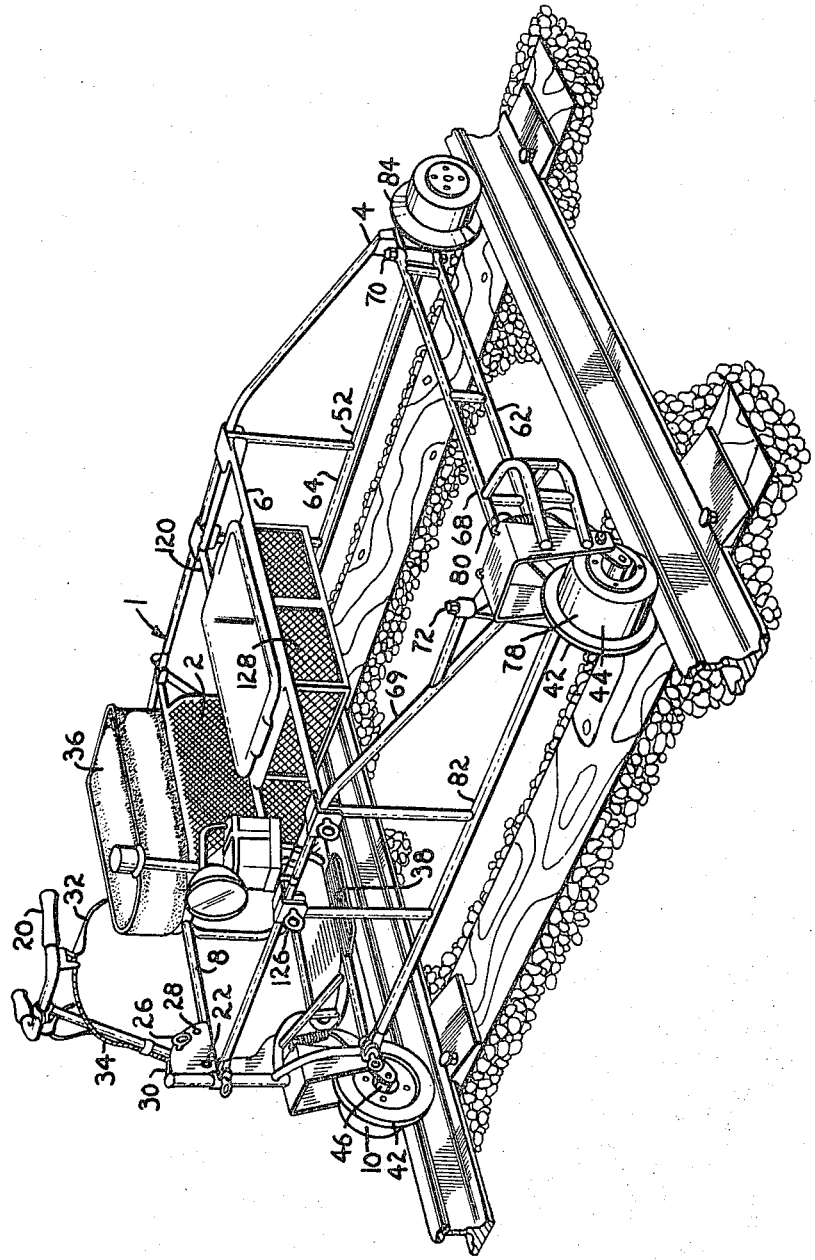
FIG. 1 is a perspective view of a rail vehicle embodying the features of this invention.

Referring to the drawings in more detail:

The reference numeral 1 generally refers to a vehicle for use on rail means embodying the features of this invention and comprised of a power unit or assembly 2, an outrigger unit or assembly 4 and a cross brace or equipment and material carrier 6. The vehicle 1 as illustrated may be rapidly and easily dismantled into three compact packages by disconnecting the outrigger assembly 4 from the power assembly 2 and the carrier 6, to facilitate transporting of the vehicle 1.

The power assembly 2 is constructed in a manner similar to a conventional motor scooter with suitable wheel means to allow for the utilization of the assembly 2 on a typical rail means or the like. The power assembly 2 includes a frame 8 having fore and aft wheels 10 and 12 respectively suitably carried thereby and a power means, illustrated herein as a gasoline driven engine 14, connected to a live axle of the aft driven wheel 12 by means of a suitable chain-sprocket wheel drive system 18.

The frame 8 of the power assembly 2 is constructed generally of a tubular steel and includes a handle bar assembly 20 swingably mounted to the frame 8 on a pivot pin 22 to allow the handle bar assembly 20 to be pivoted to an inactive position as shown at 24 in FIG. 7 by the dashed lines. The handle bar assembly 20 is retained in an upright or active position by means of a pin 26 which is selectively received through any of a plurality of apertures 28 defined in a pair of opposed retaining plates 30 to effectively lock the handle bar assembly 20 in a desired position. The pin 26 as shown in dashed lines in FIG. 7 is employed in its lower most position to lock the handle bar assembly 20 in an inoperative or completely folded position. In the illustrated embodiment, hand brakes 32, of a conventional nature, are suitably mounted to the handle bar assembly 20 for operative engagement with the aft driven wheel 12 by means of a cable 34. The frame 8 also includes a seat member 36 and a foot rest member 38 suitably secured to the frame 8 to provide an operating station for the vehicle operator.

The fore and aft wheels 10 and 12 respectively are each comprised of an aluminum hub 40 having a steel flange 42 suitably connected thereto with a tread 44 comprised of a rubber or synthetic resin material extending circumferentially about the hub 40 for engagement with the rail means to insulate the wheels from the track to prevent activation of track circuits. The forward wheel 10 has the hub 40 mounted to an axle 46 which is suitably retained by a coil tension spring suspension system 48. The aft wheel 12 is mounted on a live axle 50 which, in the illustrated embodiment, is releasably connected to a drive shaft assembly 52 to provide a driving force for the outrigger assembly 4. As illustrated, the live axle 50 carries a sprocket wheel 54 which is suitably connected to the aft driven wheel 12 by means of a plurality of bolts 56 to transmit the driving action of the engine 14 to the aft wheel 12 and through the axle 50 and drive shaft assembly 52 to the outrigger assembly 4. The aft wheel 12 of the power unit 2 includes a conventional braking assembly 58 suitably retained to the hub 42 by a plurality of bolts 60, said bolts 60 also serving to retain the flange 42 to the hub 40.

The power frame 8 and the front axle 46 are each canted at approximately 1:20 towards gauge or the center line of the track in order to permit the vehicle 1 to center itself in motion. The effect of canting both the power assembly 2 and the outrigger 4 is to allow the vehicle to track without flanging or rocking which causes the flanges 42 of the wheels to rub against the track or rail means. The rear driven axle 50, however, is maintained in a horizontal manner in order to effect the proper driving connection between the rear axle 50 and the drive shaft assembly 52. The seat member 36 of the power unit 2 may be shimmed to maintain the seat in a horizontal manner.

The outrigger assembly 4, as illustrated, is comprised of a frame 62 formed of tubular steel members having portions adaptable for releasable engagement with the power assembly 2; said frame 62 being foldable, in the manner indicated in FIG. 3, into a compact package for ease of transporting. The frame 62 of the outrigger assembly 4, as illustrated, includes a first frame means or member 64, and a second frame means or member 66; said second frame means including a first or main portion 68 and a second portion 69. The first and second frame means 64 and 66 respectively are swingably mounted by means of vertical pivot pin 70, which retains the main frame portion 68 of the second frame means 66 to the first frame means 64. The main frame portion 68 extends longitudinally of the rail means with the first frame means 64 and second frame portion 69 of the second frame means 66 extending transversely of the rail means and having end portions 74 and 76, respectively, for releasable engagement with the power assembly 2. The first and second portions 68 and 69, respectively, of the second frame means 66 are swingably connected by means of a pivot pin 72.

The main frame portion 68 has a forward wheel 78 suitably mounted thereto for rolling engagement with the rail means in opposed spaced relation from the fore wheel 10 of the power assembly 2. As illustrated in FIG. 7, the fore wheel 78 of the outrigger assembly 4 is constructed in a similar manner to that of the fore wheel 10 of the power assembly 2, having a coil tension spring suspension system 80 suitably mounted thereto to effectively cushion the frame 62 from any irregularities in the rail means.

The front axle 82 of the outrigger assembly 4 on which the wheel 78 is carried is canted 1:20 toward gauge as is the front axle 46 of the power assembly 2 for the reasons previously discussed. The first frame means 64 of the outrigger assembly 4 carries a rear driven wheel 84 and, as illustrated, the drive shaft assembly 52 which is suitably connected thereto and includes a drive shaft 86 suitably connected to a live axle 88, which carries the driven wheel 84 for imparting a rotational driving force to said rear wheel 84.

In the illustrated embodiment, the first frame means 64 includes a tubular drive shaft housing 90 releasably engageable with a tubular axle housing 92 suitably connected to the power frame 8 of the power assembly 2. The tubular housing 92 receives therethrough, the live axle 50 of the rearward wheel 12 of the power assembly 2 for releasable engagement with the drive shaft 86. As illustrated, the tubular housing 90 is releasably connected to the tubular housing 92 by means of a threaded sleeve member 94, having an interior abutment surface 96, which bears against a collar 98 on the end portion of the tubular member 92 for drawing said tubular member 92 into a contacting relation with a collar 100 on the end portion of the tubular member 90. The collar 100 has external threads for threaded engagement with the sleeve member 94. As the collars 98 and 100 of the tubular members 92 and 90 respectively are drawn into abutting relation, the end portion 102 of the live axle 50 of the power assembly 2 is received in a socket member 104 mounted to the drive shaft 86. The end portion 102 of the axle 50 defines a stud 103, which is non-circular or polygonal in shape being keyed in the socket member 103 or retained against relative rotational movement with the socket member 104 as the socket 104 is similarly formed in a non-circular or polygonal manner. The socket member 104 includes a plurality of internal abutment surfaces adapted for engagement with a plurality of mating abutment surfaces on the stud 103 of the live axle 50 such that the driving action of the engine 14 in rotating the live axle 50 is imparted to the axle 88 through the drive shaft 86.

The outrigger assembly 4 is releasably secured to the power assembly 2 by a plurality of releasable pin connections 106, as illustrated in FIG. 6. The pin connections 106, as illustrated, are comprised of a fork like member 108 suitably secured to one of the tubular steel elements of either of the frame means 64 or 66 having a pair of outwardly extending prongs 110, each of said prongs defining an aligned aperture therethrough. The prongs 110 are received in a pair of spaced slots 112 defined in a sleeve member 114, which is mounted on the power assembly 2. The sleeve member 114 defines a longitudinal through bore 116 disposed perpendicularly to the slots 112 and in communication therewith for receipt of a retaining pin 118 which passes through the aligned apertures of each of the spaced prongs 110 and the bore 116.

The tool or equipment carrier or cross brace 6 is comprised of a frame 120 having opposed end portions 122 and 124 releasably retained to the frame means 66 and 64 respectively of the outrigger assembly 4 by a plurality of releasable pin connections 126. The carrier 6 as illustrated includes a box like portion 128 defining an equipment and material carrier portion. The carrier assembly 6 provides both the means for carrying equipment, tools and the like and also serves to reinforce the structural integrity of the vehicle 1 by acting as a cross brace between the frame means 64 and the second portion 69 of the frame means 66 of the outrigger assembly at a point approximately at the center line of the rail means.

The vehicle 1 may be quickly assembled on spaced rail means by placing the power assembly 2 in an upstanding position on one of said rail means and the wheels of the outrigger assembly in opposed relation in the opposite rail means and folding the frame means 64 and the second portion 69 of the frame means 66 transversely of the rail means and engaging the end portions 74 and 76 of the frame means 64 and 66 by the pin connections 106 to the power assembly 2. The tubular housings 90 and 92 enclosing the drive shaft 86 and axles 88 and 50 may be secured in abutting relation by engaging the threaded sleeve member 94 with the threaded collar 100 on the tubular member 90, and tightening said sleeve member 94 to draw the opposed collars 98 and 100 into abutting relation. The carrier 6 may then be placed in position by simply engaging the pin connections 126 on the opposed frame means 64 and 66 of the outrigger assembly 6. In this manner the vehicle 1 may be very rapidly and easily assembled and is now ready for utilization on the rail means. By simple disengagement of the pin assemblies 126 and 106 and a rotation of the sleeve member 94 to disengage the threads of the sleeve member 94 and the collar 100, the three components of the vehicle 1 may be disassembled for ease of transportation. When transporting the various components, the handle bar assembly 20 of the power assembly 2 may be folded into a down position, as illustrated by the dashed lines in FIG. 7, with the retaining pin 26 disposed as shown in dashed lines in FIG. 7, to retain the handle bar assembly 20 in its folded position. The outrigger assembly may be folded whereby the frame members 64 and the second portion 69 of the frame member 66 lie generally parallel to and adjacent the main frame portion 68 to thereby form a compact, easily transportable package comprising the outrigger assembly 6.

It is to be understood that while we have illustrated and described one form of our invention, it is not to be limited to the specific form or arrangement of part herein described and shown, except insofar as such limitations are included in the claims.

What we claim and desire to secure by Letters Patent is:
1. A portable vehicle for use on opposed rail means comprising:
 (a) A first unit having wheel means operatively connected thereto for employment on a first rail means, said rail means including a driven axle operatively connected to the said wheel means and said first unit, including means operatively connected thereto for driving said driven axle,
 (b) a second unit having wheel means operatively connected thereto for employment on a second rail means, in opposed spaced relation to said first rail means said wheel means including an axle operatively connected to said wheel means and said second unit,
 (c) cooperative means on said axles of said first and second units for releasably connecting said axles whereby the driven axle of said first unit drives the axle of said second unit,
 (d) spaced transverse members each pivotally connected to one of said first and second units and detachably connected to the other whereby upon detachment the transverse members are foldable to a position alongside said one unit,
 (e) a spreader member between said first and second units and separably connected to the transverse members to normally retain same in unit connecting position to form a vehicle.

2. A portable vehicle as recited in claim 1, wherein said first and second units are each canted inwardly of one another to provide a stable vehicle.

3. A portable vehicle as recited in claim 1, wherein said second unit is a detachable foldable outrigger structure and the transverse members include a first frame means extending transversely of said spaced rails, said first frame means including means for supporting said axle and said wheel means and being releasably engaged with said first unit and a second frame means swingably connected to said first means and having an end portion releasably engaged with said first unit.

4. A portable vehicle as recited in claim 3, wherein said first frame means has a wheel operatively mounted thereon, said wheel being operatively connected to said axle, and wherein said second frame means includes a first portion disposed normally to said first frame means and longitudinally of said rail means, said first portion being swingably connected to said first frame means and a second portion swingably connected to said first portion and detachably connected to said first unit, said second frame means having a wheel operatively connected thereto for rolling engagement with said second rail means.

5. A portable vehicle as recited in claim 4, wherein the spreader member includes a bracing means defining a tool carrier, said bracing means having opposed end portions operatively connected to said first frame means and the second portion of said second frame means and disposed in spaced relation to each of said first and second units.

6. A portable vehicle as recited in claim 1, wherein said cooperative means for releasably connecting the driven axles includes a drive shaft having a pair of opposed end portions, one of said end portions being operatively connected to one of said axles and cooperative means on the other end of said drive shaft and said other axle for releasably connecting the drive shaft to said other axle for transmitting a driving force between said wheel means.

7. A portable vehicle as recited in claim 6, wherein said cooperative means includes means defining a socket having an axis generally parallel to said drive shaft, said socket defining means being operatively connected to one of said drive shaft and said other axle, and a stud means operatively connected to the other of said drive shaft and said other axle and removably received in said socket, cooperative means on said socket defining means to retain said stud and said socket defining means against relative axial movement and cooperative means on said drive shaft and said other axle for releasably retaining said stud in said socket.

8. A portable vehicle as recited in claim 7, wherein said socket is defined by a plurality of axially directed abutment surfaces and said stud includes a plurality of mating abutment surfaces whereby engagement of said surfaces on said stud and said socket retain said stud and socket defining means against relative axial rotation while permitting selective withdrawal of said stud from said socket defining means.

9. A portable vehicle as recited in claim 7, including a drive shaft-axle housing wherein said housing is separable, having first and second portions, and wherein said drive shaft is rotatably mounted within said first portion and said other axle is rotatably mounted in said second portion and said other axle is rotatably mounted in said second portion and wherein said first portion is connected to one of said first and second units and said second portion is connected to said other unit, and including cooperative means on said first and second portions for releasably retaining said portions together with said stud received in said socket defining means.

References Cited

UNITED STATES PATENTS

| | | | |
|---|---|---|---|
| 950,241 | 2/1910 | Reynolds | 106—162 X |
| 1,081,080 | 12/1913 | Adams | 105—162 |
| 1,195,380 | 8/1916 | Miller | 105—26.1 |
| 1,436,532 | 11/1922 | Revny | 105—95 |

DRAYTON E. HOFFMAN, *Primary Examiner.*

H. BELTRAN, *Assistant Examiner.*

U.S. Cl. X.R.

105—95, 162, 215